United States Patent [19]
Kerns

[11] Patent Number: 5,907,854
[45] Date of Patent: May 25, 1999

[54] FLASH MEMORY FILE SYSTEM FOR WRITING DATA FILES WITHOUT REWRITING AN ENTIRE VOLUME

[75] Inventor: Daniel J. Kerns, Petaluma, Calif.

[73] Assignee: Alcatel USA Sourcing, L.P., Plano, Tex.

[21] Appl. No.: 08/721,904

[22] Filed: Sep. 27, 1996

[51] Int. Cl.[6] .................................................. G06F 12/00
[52] U.S. Cl. .......................................... 711/103; 711/209
[58] Field of Search ................................... 711/103, 102, 711/104, 105, 209; 395/800.37

[56] References Cited

U.S. PATENT DOCUMENTS

| | | | |
|---|---|---|---|
| 5,457,658 | 10/1995 | Niijima et al. | 365/218 |
| 5,473,775 | 12/1995 | Sakai et al. | 395/652 |
| 5,537,576 | 7/1996 | Perets et al. | 711/150 |
| 5,544,356 | 8/1996 | Robinson et al. | 707/205 |
| 5,566,321 | 10/1996 | Pase et al. | 711/153 |
| 5,581,723 | 12/1996 | Hasbun et al. | 711/103 |
| 5,737,742 | 4/1998 | Achiwa et al. | 711/103 |
| 5,809,558 | 9/1998 | Matthews | 711/173 |
| 5,812,814 | 9/1998 | Sukegawa | 711/103 |
| 5,819,307 | 10/1998 | Iwamoto | 711/103 |

*Primary Examiner*—Tod R. Swann
*Assistant Examiner*—Christopher S. Chow
*Attorney, Agent, or Firm*—Baker & Botts, L.L.P.

[57] ABSTRACT

A file system (10) for a memory device includes a first volume (12), a second volume (14), and a third volume (16). The first volume (12) is located at a highest portion of the memory space defined by the file system (10) of the memory device and includes a primary volume and directory entry control block area (18) to store the control blocks associated with the entire memory space of the memory device. Control blocks are stored in a descending order within the first volume (12). The second volume (14) is located at an intermediate portion of the memory space defined by the file system (10) and includes a secondary volume and directory entry control block area (20) to store the control blocks when the primary control block area (18) of the first volume (12) is being erased and rewritten into. The third volume (16) is located at a lowest portion of the memory space defined by the file system (10) and is used to store data files in an ascending direction.

23 Claims, 1 Drawing Sheet

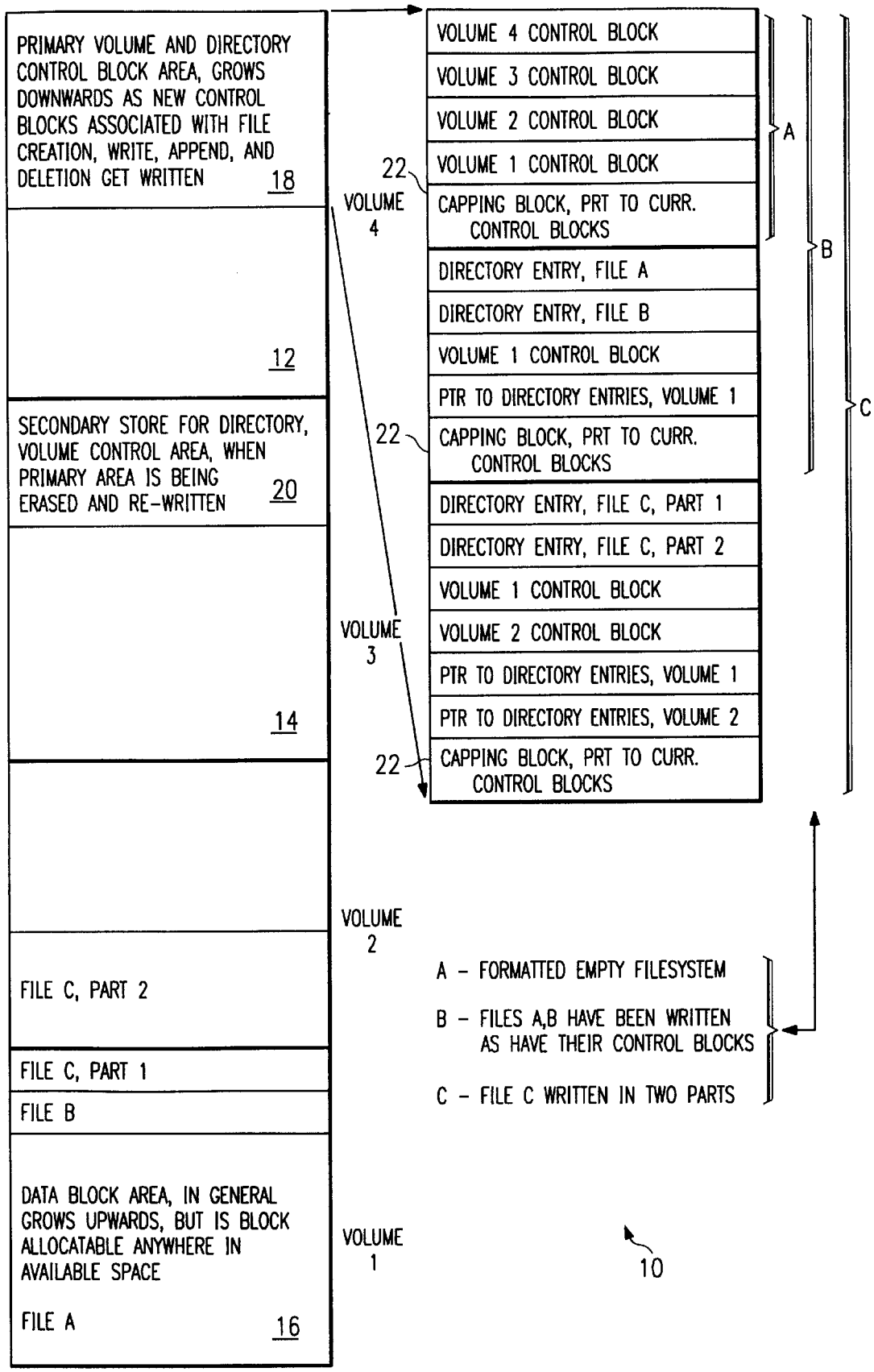

FLASH MEMORY FILE SYSTEM FOR WRITING DATA FILES WITHOUT REWRITING AN ENTIRE VOLUME

TECHNICAL FIELD OF THE INVENTION

The present invention relates in general to memory devices and more particularly to a file system for a memory.

BACKGROUND OF THE INVENTION

A flash eraseable programmable read only memory is a memory device containing many sectors and which is sector erasable and byte programmable. The memory device is typically divided into a plurality of volumes which are the unit eraseble quantity of memory on a given piece of hardware. A volume may be a single sector or multiple sectors of a storage space representing the capacity of the memory. Prior to writing to, or programming, a location within the memory device, the volume within which the location is found must be first erased and then the whole volume is rewritten to include the programmed location. Thus, programming of a single location requires an erase cycle of the volume within which the single location is located and a write time to rewrite the erased volume. Typical erase cycles take approximately one second to complete, an eternity to a computer system in processing information.

The erasing of a complete volume every time a location is programmed occurs due to a file system of the memory device. The file system of a memory device determines the arrangement of data files within the memory space of the memory device. Operations with respect to the file system include formatting the file system and creating, writing, reading, appending to, and deleting data files. A data file may have associated with it a directory entry and a volume entry that reside in the memory device as control blocks. The directory entry describes aspects and attributes of the associated data file and the volume entry describes the underlying technology of the memory device. Typically, the control blocks for the directory entry and volume entry of an associated data file are stored within the same volume as the associated data file in accordance with the file system of the memory device. Such file system structure leads to time consuming erasure and rewriting of entire volumes of the memory device even though only a single location may be programmed. Therefore, it is desirable to have a memory device which does not require a lengthy erasure of an entire volume when programming a single location within memory device.

SUMMARY OF THE INVENTION

From the foregoing, it may be appreciated that a need has arisen for a memory device that programs memory space locations without erasing locations that are desired to remain unchanged. In accordance with the present invention, a file system for a memory device is provided that substantially eliminates or reduces disadvantages and problems associated with conventional flash memory devices.

According to an embodiment of the present invention, there is provided a file system for a memory that includes a first volume having volume and directory entry control block areas operable to store volume and directory entry control blocks. The first volume is located at a highest portion of memory space of the memory. A second volume is operable to store the volume and directory entry control blocks when the volume and directory entry control block areas of the first volume are being erased and rewritten. The second volume is located in an intermediate portion of memory space of the memory. A third volume has a data block area operable to store data files. The third volume is located at a lowest portion of memoryspace of the memory.

The present invention provides various technical advantages over conventional flash memory devices. For example, one technical advantage is to provide a memory device that does not require erasure of an entire volume in order to program a single location of memory space. Another technical advantage is to erase and write to a specific locations without affecting other locations within the memory space. Yet another technical advantage is to provide accurate and efficient programming fault determinations that identify specific locations that have been corrupted. Still another technical advantage is to provide a flash memory device that shares qualities and attributes of other non-volatile storage devices, such as magnetic disk drives and semiconductor random access memories, with respect to fixed capacity and read/write access speeds. A further technical advantage is the ability to recover the file system state up to the last complete file operation in the event of power down and restoration of power of the memory device. Other technical advantages are readily apparent to one skilled in the art from the following FIGURE, decription, and claims.

BRIEF DESCRIPTION OF THE DRAWING

For a more complete understanding of the present invention and the advantages thereof, reference is now made to the following description taken in conjunction with the accompanying drawings, wherein like reference numerals represent like parts, in which:

The FIGURE illustrates a file system for a memory device.

DETAILED DESCRIPTION OF THE INVENTION

The FIGURE illustrates a simplified block diagram of a file system 10 for a memory device such as a flash electrically programmable read only memory. File system 10 divides a memory space of the memory device into a plurality of volumes that include a first volume 12, a second volume 14, and a third volume 16. First volume 12 is located at a highest portion of the memory space of the memory device. Second volume 14 is located at an intermediate portion of the memory space of the memory device. Third volume 16 is located at a lowest portion of the memory space of the memory device.

File system 10 is arranged such that volume and directory entry control blocks associated with the entire memory space of the memory device are stored in a primary volume and directory entry control block area 18 within first volume 12. Volume and directory entry control blocks are created in a downward direction within first volume 12. Second volume 14 includes a secondary volume and directory control block area 20 to store the volume and directory entry control blocks when primary volume and directory control block area 18 is being erased and rewritten into. Data files associated with the volume and directory entry control blocks are stored in an upward direction within file system 10 of the memory device beginning with third volume 16.

Though data files are generally stored in an upward direction of file system 10, data files may be written anywhere into available space of first volume 12, second volume 14, and third volume 16. Data files may also be block allocatable anywhere within available memory space of file system 10. Further, individual data files may be erased and written into without erasing and rewriting an entire volume of file system 10 and without affecting any other data files stored in file system 10. By being able to individually store data files within file system 10, software upgrades can be readily made to a system employing a memory device with file system 10. File system 10 also allows for identifying the occurrence of faults that may happen during programming without requiring a reload of the memory device.

If available memory space exists in the memory device, file operations will proceed to completion without invoking any time consuming erase cycles. However, erase cycles may take place for those data files which are no longer required in order to free up available memory space. Erase cycles to free up available data file space may take place simultaneously with file access operations as a background task in file system 10.

The access mechanisms for file system 10 allow for the memory device to survive a power down or failure and have complete recovery of the state of file system 10 up until the point of the last complete file operation upon restoration of power. This is accomplished through the use of a capping block 22 stored in control block area 18 of first volume 12. Capping control block 22 allows for the recovery of file system 10 up to the location of capping block 22 by pointing to all other relevant control blocks. At power restoration, any microprocessor reading through the descending primary control block area 18 of first volume 12 will look for the most recently written version of capping block 22 to recreate file system 10 as it existed prior to the last power down.

The descending storage scheme of control blocks within first volume 12 will occasionally require compacting to adjust for changes in data files stored in file system 10. Compacting requires a complete erasure of primary volume and directory entry control block area 18 and subsequent rewriting of the minimum set of control blocks needed to describe the current state of file system 10. Secondary control block area 20 allows for storage of the control blocks prior to compacting, minmizing the risk of loss of the control blocks to a system fault. After successful completion of the compacting operation, secondary control block area 20 is erased for later reuse. The compacting operation is a separate and distinct task from a file access operation and can be performed simultaneously as a background task.

File system 10 provides the features of control block entries into a descending stack at the highest portion of the memory space, recoverability of available memory space through erasure of unwanted data files, and compacting of primary control block area 18. These features of file system 10 provide the access mechanisms to present a read/write non-volatile mass storage device with fixed capacity and burst oriented read and write access times on the order of that for a magnetic hard disk drive and a semiconductor random access memory, respectively.

Thus, it is apparent that there has been provided, in accordance with the present invention, a file system for a memory device that satisfies the advantages set forth above. Although the present invention has been described in detail, it should be understood that various changes, substitutions, and alterations readily ascertainable to one skilled in the art can be made herein without departing from the spirit and scope of the present invention as defined by the following claims.

What is claimed is:

1. A file system for a flash memory, comprising:
    a first volume having volume and directory entry control block areas operable to store volume and directory entry control blocks, the volume and directory entry control blocks being associated with an entire memory space of the memory, the first volume located at a highest memory space of the memory;
    a second volume operable to store the volume and directory entry control blocks, the second volume providing storage for the volume and directory entry control blocks when the volume and directory entry control block areas of the first volume are being erased and rewritten, the second memory located in an intermediate memory space of the memory;
    a third volume having a data block area operable to store data files, the third volume located at a lowest memory space of the memory.

2. The file system of claim 1, wherein the data files are written in an upward direction from the third volume towards the first volume.

3. The file system of claim 1, wherein the data files are block allocatably written anywhere in available space of the first, second, and third volumes.

4. The file system of claim 1, wherein the volume and directory entry control blocks are written into the volume and directory entry control block areas of the first volume in a descending direction towards the third volume.

5. The file system of claim 1, wherein individual data files may be written into any of the first, second, and third volumes without rewriting an entire one of the first, second, and third volumes as a result of the volume and directory entry control blocks associated with the entire memory space being in the first volume.

6. The file system of claim 1, wherein data files are written into available space of the first and second volumes.

7. A flash memory device having a memory space for storing information, comprising:
    a first storage space operable to store volume and directory entry control blocks associated with an entirety of the memory space, the first srorage space located at a highest portion of the memory space;
    a second storage space operable to store the volume and directory entry control blocks when the first storage space is being erased and rewritten, the second storage space located at an intermediate portion of the memory space;
    a third storage space operable to store data files, the third storage space located at a lowest portion of the memory space.

8. The flash memory device of claim 7, wherein the volume and directory entry control blocks are stored in the first storage space in a descending order towards the second and third storage spaces.

9. The flash memory device of claim 7, wherein the data files are stored in the third storage space in an upward direction towards the second and first storage spaces.

10. The flash memory device of claim 7, wherein the data files may be block allocatably written into any available space of the first, second, and third storage spaces.

11. The flash memory device of claim 7, wherein the data files may be individually written into any available space of the first, second, and third storage spaces without rewriting an entire one of the first, second, and third storage spaces as a result of the volume and directory entry control blocks associated with the entire memory space being in the first storage space.

12. The flash memory device of claim 7, wherein the data files may be written into the first and second storage spaces.

13. A method of storing information to a flash memory device, comprising steps of:

writing data files into the flash memory device beginning with a lowest portion of a memory space of the flash memory device, the data files being written in a substantially ascending direction in the memory space;

writing control blocks associated with the data files into the flash memory device beginning with a highest portion of the memory space separate from the lowest portion of the memory space, the control blocks being written in a substantially descending direction in the memory space.

14. The method of claim 13, further comprising a step of:

compacting the control blocks into a smaller area of the highest portion of the memory space.

15. The method of claim 14, further comprising a step of:

backing up the control blocks into an intermediate portion of the memory space before performing the compacting step to prevent control block loss in the event of a memory fault.

16. The method of claim 15, further comprising the step of:

erasing the control blocks in the intermediate portion of the memory space after completion of the compacting step.

17. The method of claim 14, wherein the compacting step includes identifying a minimum number of control blocks required to describe a file system of the memory space.

18. The method of claim 16, wherein the control blocks are erased from the highest portion of the memory space and the minimum number of control blocks required to describe the file system of the memory space are written into the highest portion of the memory space.

19. The method of claim 14, wherein the compacting step is performed simultaneously with the data files writing step.

20. The method of claim 13, wherein individual data files may be written into any available portion of the memory space without affecting other data files stored in the memory space as a result of separation of the data files from the control blocks within the memory space.

21. The method of claim 13, wherein data files may be block allocatably written into any available portion of the memory space.

22. The method of claim 13, further comprising a step of:

erasing individual data files from the memory space that are no longer required.

23. The method of claim 22, wherein the data file writing step, the control block writing step, and the erasing step occur simultaneously.

* * * * *